United States Patent
Dieckröger

(10) Patent No.: US 6,574,413 B1
(45) Date of Patent: Jun. 3, 2003

(54) ARRANGEMENT AND METHOD FOR THE CHANNEL-DEPENDENT ATTENUATION OF THE LEVELS OF A PLURALITY OF OPTICAL DATA CHANNELS

(75) Inventor: Jens Dieckröger, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/761,805

(22) Filed: Jan. 16, 2001

(30) Foreign Application Priority Data

Jan. 15, 2001 (DE) .......................... 101 02 460

(51) Int. Cl.[7] ................................. G02B 6/00
(52) U.S. Cl. .................... 385/140; 385/31; 385/39; 385/48
(58) Field of Search ............... 385/140, 48, 39, 385/45, 31

(56) References Cited

U.S. PATENT DOCUMENTS

| | | | |
|---|---|---|---|
| 5,519,796 A | 5/1996 | Li et al. | |
| 5,933,270 A | 8/1999 | Toyohara | |
| 5,953,467 A | 9/1999 | Madsen | |
| 6,212,315 B1 | * 4/2001 | Doerr | ................ 385/31 |
| 6,332,055 B1 | * 12/2001 | Hatayama et al. | .......... 385/140 |

* cited by examiner

Primary Examiner—Rodney Bovernick
Assistant Examiner—Sung Pak
(74) Attorney, Agent, or Firm—Laurence A. Greenberg; Werner H. Stemer; Ralph E. Locher

(57) ABSTRACT

The invention relates to an arrangement and a method for the channel-dependent attenuation of the levels of a plurality of optical data channels which each transmit signals of a specific wavelength. The invention provides filter means (1), which split an input signal of the plurality of data channels between at least two optical paths (3, 4) in a wavelength-dependent manner, and attenuating means (2) on at least one of the optical paths (4), which attenuate the signal component of the corresponding path, the paths (3, 4) and signal components being recombined downstream of the attenuating means (2). The invention enables spectral-dependent attenuation of an input signal composed of a plurality of optical signals of different wavelength.

29 Claims, 7 Drawing Sheets

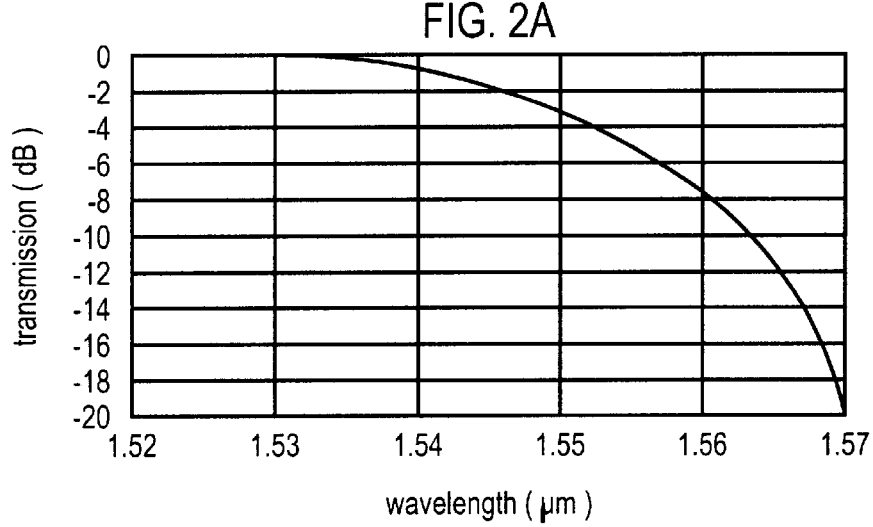
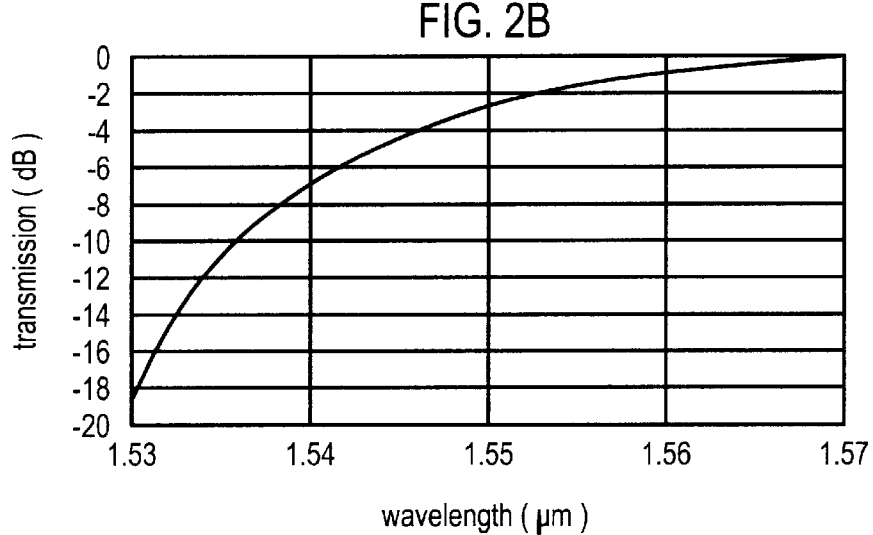
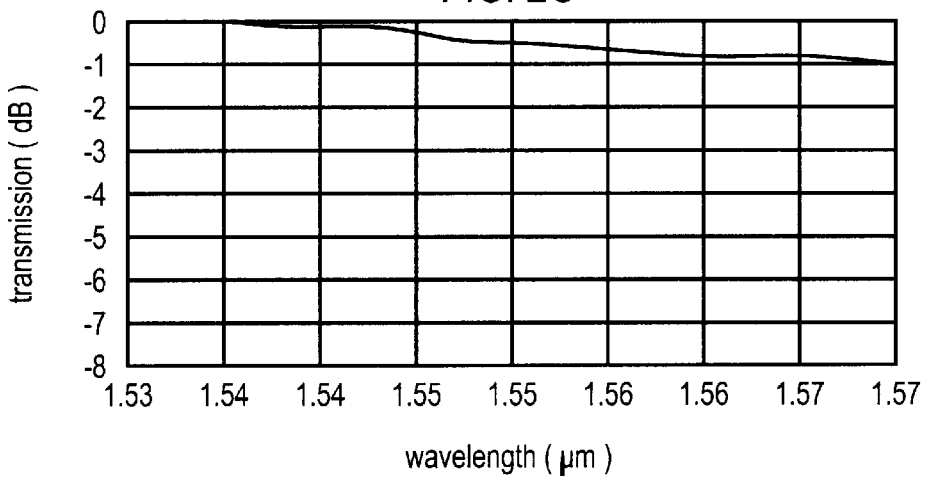

ARRANGEMENT AND METHOD FOR THE CHANNEL-DEPENDENT ATTENUATION OF THE LEVELS OF A PLURALITY OF OPTICAL DATA CHANNELS

BACKGROUND OF THE INVENTION

Field of the Invention

The invention relates to an arrangement and a method for the channel-dependent attenuation of the levels of a plurality of optical data channels.

It is known to use fiber amplifiers, for example erbium fiber amplifiers in optical wide area networks for the purpose of amplifying the optical signals. Such fiber amplifiers have the property of amplifying signals of different wavelengths to different extents. The result of this is that, e.g. in WDM systems (wavelength division multiplex), in which information is transmitted in parallel on a plurality of data channels of different wavelength in a fiber, the individual data channels are amplified to different extents depending on the carrier wavelength. On account of this amplification to different extents, it is necessary to equalize the individual data channels again after amplification using an attenuator unit per channel (equalizing).

The publication "Tunable Gain Equalization Using a Mach-Zehnder Optical Filter in Multistage Fiber Amplifiers", Kyo Inoue, Toshimi Kominatot, Hiromu Toba, IEEE Photonics Technology Letters, Vol. 3, No. 8, August 1991, p. 718–720, discloses attenuating in a channel-dependent manner, using a Mach-Zehnder interferometer, the optical signals of individual optical data channels that have been amplified to non-uniform extents by an amplifier, in order to obtain a uniform signal level on the individual channels. In this case, the Mach-Zehnder interferometer is configured as a filter which a attenuates higher wavelengths to a greater extent and thereby compensates for elevated amplification of these wavelengths by the preceding optical amplifier.

This attenuator arrangement has the disadvantage that its range of use is restricted to the specific application mentioned.

SUMMARY OF THE INVENTION

The present invention is based on the object of providing an arrangement and a method for the channel-dependent attenuation of the levels of a plurality of optical data channels which can be used in a multiplicity of applications.

Accordingly, the invention provides for an input signal of the plurality of data channels to be split in a wavelength-dependent manner between at least two optical paths, for the signal component of one of the optical paths to be attenuated and for the paths subsequently to be recombined. The invention is based on the concept of attenuating only a part of the input signal, which differs from the other part of the input signal in terms of its frequency composition, while the other part remains unchanged. Since only one of the signal components which differ in terms of their frequency spectrum is attenuated, spectral-dependent attenuation of the input signal which is composed of a plurality of optical signals of different wavelength is effected.

This opens up a multiplicity of possible applications. In particular it is possible for only individual channels to be attenuated, while other channels remain essentially unchanged. It is also possible for specific frequency ranges to be attenuated in a manner that is amplified in a targeted way, while other frequency ranges are not attenuated or are only slightly attenuated.

It is pointed out that it lies within the scope of the invention to perform attenuation of the signals on one or the other optical path. In this case, it may be expedient to provide suitable attenuating means on both paths, one or the other attenuating means being activated depending on the application, so that the spectrally different signals of one or the other path are attenuated.

In a preferred refinement of the invention, the signal is attenuated virtually wavelength-independently in the attenuating means, i.e. the transmission has a flat spectrum. The effect achieved as a result of this is that the spectral components of the respective path are attenuated to the same degree. The overall frequency-dependent attenuation is produced only after combination of the path having the attenuated signal component with the other path, whose signal component was not attenuated.

In an advantageous design of the invention, the filter means are designed in such a way that an upper channel of an upper wavelength is conducted completely through one path, a lower channel of a lower wavelength is conducted completely through the other path and the channels of the intervening wavelengths are conducted to a greater extent through one or the other path depending on their proximity to the upper and lower wavelength. After the signal attenuated in this way has been combined with the unattenuated signal of the other path, the resulting transmission of the overall arrangement is one which falls approximately linearly with respect to the wavelength.

In an alternative refinement, the filter means are designed in such a way that a middle channel of a middle wavelength is conducted completely through one path and the channels of the further wavelengths are conducted increasingly through the other path with increasing distance from the middle channel. This leads to the overall arrangement having a transmission which falls predominantly only in the middle wavelength range.

A further refinement consists in the filter means being designed in such a way that every n-th channel, for example every second channel, in each case being conducted through a different path. This makes it possible for every n-th channel to be attenuated in a targeted manner or even to be entirely masked out, thereby enabling add-drop applications.

The filter means are preferably realized by a first Mach-Zehnder interferometer having a first and a second arm of different lengths. The two arms merge with the first and second path. In this case, the first Mach-Zehnder interferometer operates as a filter and splits the input signal between two paths as a function of the wavelength. In a development of the invention, it is possible here for one of these paths to be split again between two paths by using a further Mach-Zehnder interferometer operating as a filter.

Preferably, it is provided that a first phase shifter is additionally located on one arm of the Mach-Zehnder interferometer operating as a filter. The use of a phase shifter means that the filter property can also easily be controlled, so that technology fluctuations, for example, can be compensated.

The attenuating means are preferably realized by a second Mach-Zehnder interferometer, which splits the signals of one path into two arms (Y-splitter) and recombines them downstream of the Mach-Zehnder interferometer (Y-combiner). In this case, although the two arms have the same length, a second phase shifter is located on one arm, via which phase shifter a phase shift of the two arms and hence an attenuation of the signal of the corresponding path can be set.

The phase shifter, like the phase shifter of the first Mach-Zehnder interferometer as well, is preferably formed by a heating electrode via which the corresponding arm of the waveguide can be locally heated. This leads to an increase in refractive index in the heated region and thus to a phase shift.

Preferably, it is provided that the two paths between which the input signal is split by the first Mach-Zehnder interferometer are recombined in phase after the signal of one path has been attenuated. The signal of the other path has traversed a parallel waveguide without interference. In-phase combination of the two signal components avoids additional attenuation during the addition of the signals and hence optimizes the transmission of the entire structural part.

In this case, provision is preferably made for arranging a third phase shifter in the path in which the signal is not attenuated, via which phase shifter the phase difference between the two paths can be set in a targeted way and only the transmission of the entire structural part can be optimized or else attenuated in a targeted way.

The data channels used preferably lie in a wavelength range between 1530 nm and 1570 nm. By way of example, 40 data channels are realized in this range, and their carrier wavelength in the frequency domain in each case has a spacing of 100 GHz.

The arrangement is preferably of integrated optical design. In particular, the light signals of the data channels are transmitted in an integrated optical waveguide. A preferred application consists in the arrangement directly downstream of an optical amplifier that is likewise of integrated optical design, in order to compensate for the non-uniform optical gain of said amplifier.

BRIEF DESCRIPTION OF THE DRAWINGS

FIG. 2a shows a first exemplary embodiment of the spectral composition of the signal of one path of the arrangement in accordance with FIG. 1;

FIG. 2b shows the spectral composition of the other path of the exemplary embodiment of FIG. 2a;

FIG. 2c shows the total attenuation of the arrangement in the exemplary embodiment of FIGS. 2a, 2b and in the case of an attenuation of the signal of the second path by 20%;

FIG. 3b shows the spectral composition of the other path of the exemplary embodiment of FIG. 3a;

DESCRIPTION OF THE PREFERRED EMBODIMENT

Figure 1:
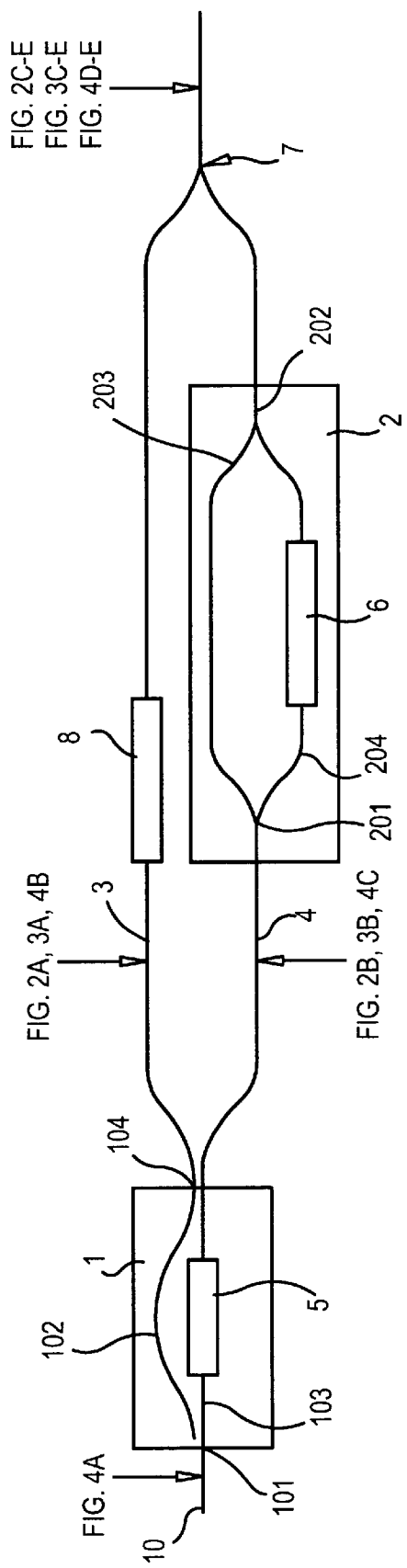
FIG. 1 diagrammatically shows the structure of an arrangement according to the invention for the channel-dependent attenuation of a plurality of data channels of different wavelength.

FIG. 1 shows an attenuator arrangement according to the invention, which has two cascaded Mach-Zehnder interferometers 1, 2 as essential constituents. The first Mach-Zehnder interferometer 1 splits an input signal present at the input 101 of the Mach-Zehnder interferometer 1 into a first and a second optical path 3, 4. One path 4 subsequently traverses the second Mach-Zehnder interferometer 2. The other path 3 is routed past the second Mach-Zehnder interferometer 2 in a waveguide having a length which should preferably be chosen such that the signals of the two paths 3, 4 are combined in phase. Downstream of the second Mach-Zehnder interferometer 2, the two paths 3, 4 are recombined by a Y-combiner 7. The structure is explained in more detail below.

The signals of a plurality of data channels, for example of a WDM system, which are transmitted in an optical waveguide 10 are present at the input 101 of the first Mach-Zehnder interferometer 1. In this case, the individual data channels each have a different wavelength. In the exemplary embodiment illustrated, the wavelengths of the data channels lie in the range between 1530 nm and 1570 nm. In the frequency domain, the channel spacing is preferably 100 GHz, with the result that a total of 40 channels are formed in the frequency range considered.

The Mach-Zehnder interferometer 1 operates as a spectral filter. A 3-DB coupler is present at its input 101 and splits the input signal into identical parts between two arms 102, 103 of the filter 1. In this case, the two arms 102, 103 have a different length. By way of the length difference $\Delta L$ between the Mach-Zehnder arms 102, 103, the filter property of the filter 1 can be arbitrarily configured in a wide range and thus be designed for a wide variety of applications. The intensity at the two outputs of the filter relative to the input intensity $I_0$ is given by:

$$I_{Path1}/I_0 = \sin^2((\pi \cdot n/\lambda) \cdot \Delta L) \quad (1)$$

$$I_{Path2}/I_0 = \cos^2((\pi \cdot n/\lambda) \cdot \Delta L) \quad (2)$$

In this case, n denotes the effective refractive index of the waveguide, $\lambda$ denotes the light wavelength and $\Delta L$ denotes the difference in length of the two arms 102, 103 of the Mach-Zehnder interferometer.

In order to be able to accurately set the phase difference between the two arms 102, 103, a phase shifter 5 is additionally located on the lower arm 103 and makes it possible to accurately set the phase difference between the signals running in the two arms. Technology fluctuations can thereby be compensated.

At the output 104 of the Mach-Zehnder interferometer 1, the two arms 102, 103 merge with the two separate optical paths 3, 4. The input signal is thus split between the two paths 1, 2 by the Mach-Zehnder interferometer 1. As will be explained below, the signals of the respective path are spectrally filtered to the effect that the signals transmitted on the two paths have a different frequency distribution or spectral distribution. This is connected with the fact that, at the output node 104, the phase-shifted signals of the two arms 102, 103 interact with one another in such a way that phase-leading wavelengths and phase-lagging wavelengths are respectively coupled into the other path in each case, with the result that different spectral weighting is effected in the two paths 3, 4.

The signal of the lower path 4 then passes through the second Mach-Zehnder interferometer 2, which is configured as an attenuator unit. The attenuating unit 2 comprises 2 Y-splitters 201, 202 between which run the two arms 203, 204 of the Mach-Zehnder interferometer 2. In this case, the two arms 203, 204 have no difference in length, with the result that the attenuating unit is only weakly wavelength-dependent. A phase shifter 6 is located on one arm 204, and the phase difference between the signals of the two arms 203, 204 can be set by means of said phase shifter.

By way of example, heating electrodes which are applied using thin-film technology, e.g. from chromium, serve as phase shifters in the case of waveguide structures embodied in $SiO_2$ on silicon. The heating power of the heating electrodes can be controlled electrically by impressing a current into the chromium film. In this way, the waveguide can be locally heated by means of the impressed current. This heating causes an increase in refractive index via the thermo-optical effect, with the result that, by way of the impressed current or the heating caused by the latter, the optical path length can be set and a phase shift can thus be produced between the two signals of the two arms 203, 204.

The transmission of the Mach-Zehnder attenuating unit 2 is given as a function of the temperature difference between the two arms 203, 204 of the Mach-Zehnder interferometer by the formula:

$$I_{out} = I_{In} \cdot \cos^2(\pi \cdot n \cdot L_H \cdot \alpha \cdot \Delta T / \lambda), \qquad (3)$$

where n is equal to the effective refractive index of the waveguide, $\lambda$ is equal to the wavelength, $L_H$ is equal to the length of the heating electrode, $I_{In}$ is equal to the optical input power, $I_{out}$ is equal to the optical output power, $\Delta T$ is equal to the temperature difference and a is equal to the thermo-optical coefficient dn/dT.

In the wavelength range between 1530 nm and 1570 nm, this is a virtually wavelength-independent function over a temperature range from zero to 100° C. This means that the Mach-Zehnder attenuating unit 2 attenuates the input signal as a function of the temperature difference in a virtually spectrally independent manner. In this case, the degree of attenuation can be set in a targeted manner via the phase shifter 6.

The other signal component, running via the other path 3, runs through a parallel waveguide without interference. The two signals are recombined at the output of the arrangement by means of the Y-combiner 7. In this case, the signals are added depending on the phase difference. Therefore, a further phase shifter 8 is provided in the path 3 which does not run through the attenuating unit 2, and the phase difference between the signals of the two paths 3, 4 can be set by means of said phase shifter. The phase shifter 8 ensures that the signals are combined in phase.

If a phase shifter is dispensed with, then the length of the waveguide or of the path 3 must be chosen exactly such that the signals of the two paths are combined in phase. If the phase difference is zero or a multiple of $2\pi$, then the two signals are combined virtually without any losses by means of the Y-combiner 7. Otherwise, additional losses are incurred.

The attenuator arrangement of FIG. 1 is preferably designed as an integrated optical structural part. The waveguide structures are produced for example using silicon dioxide on silicon technology. However, in principle all technologies and materials in which integrated optical components can be produced are suitable. By way of example, the integrated optical waveguides can also be produced from polymers, $LiNbO_3$, InGaAsP/InP, GaAlAs/GaAs or in glass by means of ion exchange.

A first exemplary embodiment of the arrangement according to the invention in accordance with FIG. 1 is illustrated in FIGS. 2a to 2e. In the first exemplary embodiment, the length difference $\Delta L$ between the two arms 102, 103 in the first Mach-Zehnder interferometer is chosen such that the input signal lies completely in the first path 3 at 1530 nm and completely in the second path 4, i.e. the path with the attenuator unit 2, at 1570 nm. Accordingly, the transmission of the filter 1, which is plotted in each case as a function of the wavelength in FIGS. 2a to 2e, for the first path 3 is such that there is no attenuation at all at 1530 nm and the attenuation rises to 20 dB up to the wavelength of 1570 nm. In accordance with FIG. 2b, the transmission for the second path 4 is exactly the opposite, i.e. the lower wavelength is attenuated and the upper wavelength is transmitted without attenuation.

This filter property of the filter 1 is obtained by virtue of the fact that the length difference between the two paths 102, 103 of the Mach-Zehnder interferometer 1 is such that, at the coupling point 104 of the two paths, the phase of the lower wavelengths in the lower path 103 leads and correspondingly couples into the path 104. Likewise, the phase of the higher wavelengths in the upper path 102 leads and these wavelengths correspondingly couple into the lower path 103.

Figure 2D:
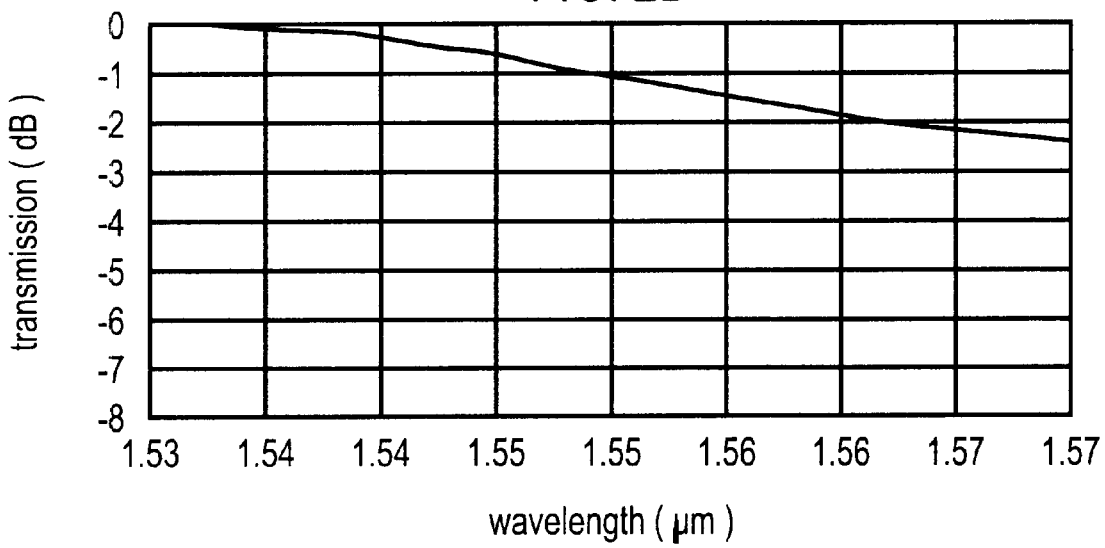
FIG. 2d shows the total attenuation of the arrangement in the exemplary embodiment of FIGS. 2a, 2b and in the case of an attenuation of the signal of the second path by 40%.
Figure 2E:
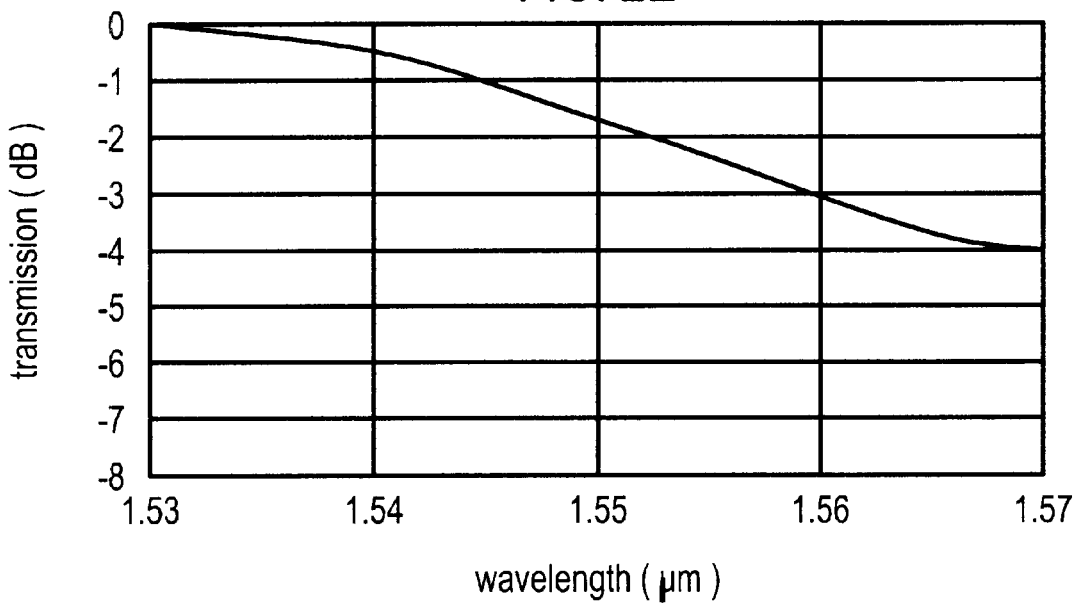
FIG. 2e shows the total attenuation of the arrangement in the exemplary embodiment of FIGS. 2a, 2b and in the case of an attenuation of the signal of the second path by 60%.

FIGS. 2c to 2e show the transmission of the entire attenuator unit as a function of the wavelength—referred to hereinafter as the transmission spectrum—for an attenuation of the signal running in the lower path 4 in the Mach-Zehnder attenuating unit 2 by 20%, by 40% and by 60%, respectively. It is evident from these figures that the attenuation decreases approximately linearly with increasing wavelength, the gradient of the linear decrease being set by means of the attenuator unit 2.

FIG. 3 shows an alternative application example, in which the Mach-Zehnder interferometer 1 is set in such a way that predominantly only the middle wavelength range around approximately 1550 nm is passed via the attenuating unit 2. The filter 1 is set in a corresponding manner by way of the setting of the length difference $\Delta L$.

Figure 3A:
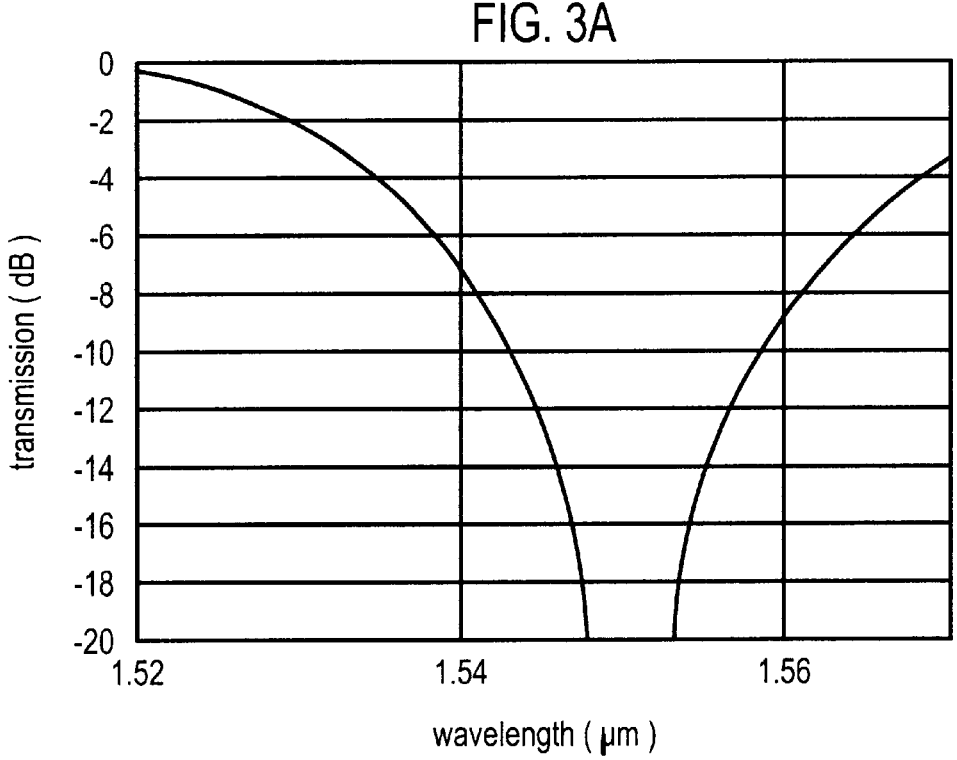
FIG. 3a shows a second exemplary embodiment of the spectral composition of the signal of one path of the arrangement in accordance with FIG. 1.
Figure 3B:
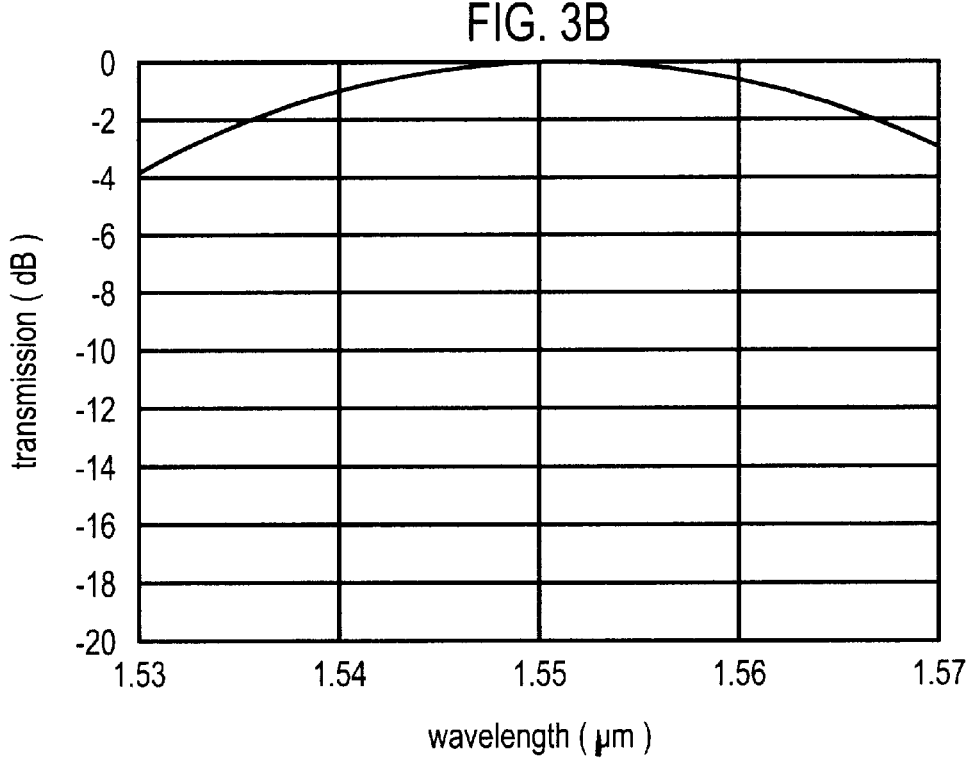
Figure 3C:
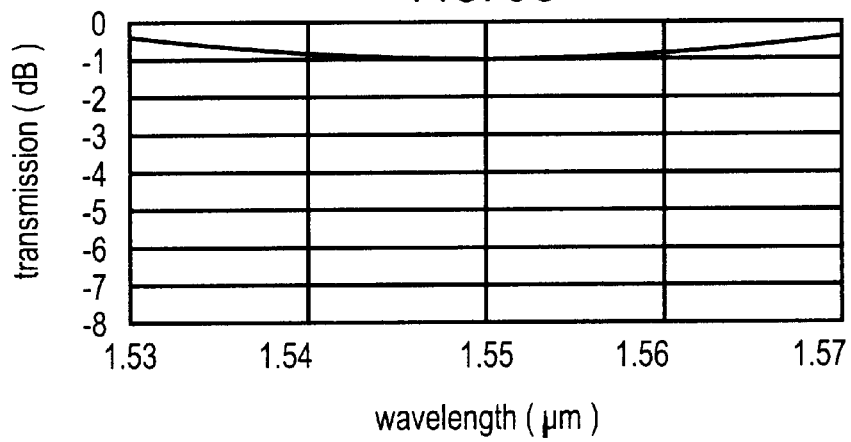
FIG. 3c shows the total attenuation of the arrangement in the exemplary embodiment of FIGS. 3a, 3b and in the case of an attenuation of the signal of the second path by 20%.
Figure 3D:
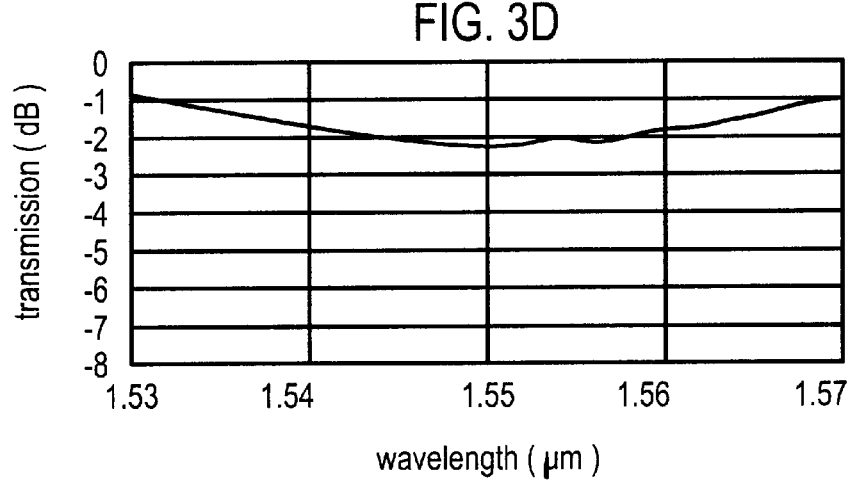
FIG. 3d shows the total attenuation of the arrangement in the exemplary embodiment of FIGS. 3a, 3b and in the case of an attenuation of the signal of the second path by 40%.
Figure 3E:
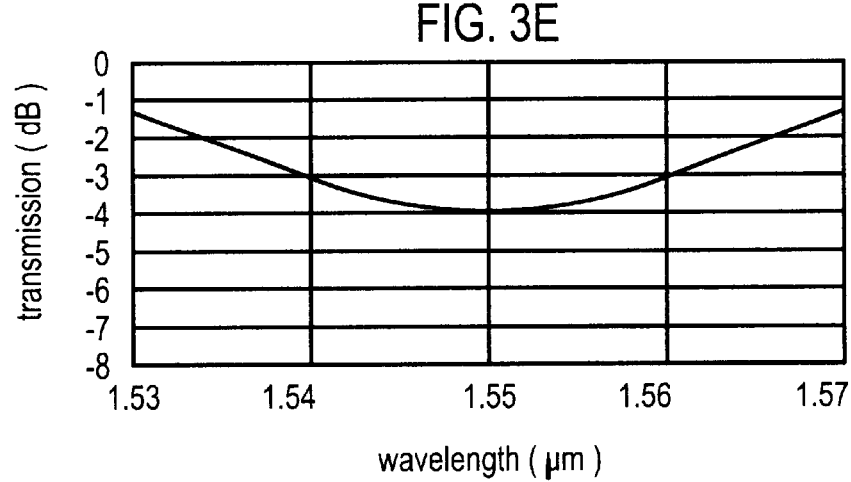
FIG. 3e shows the total attenuation of the arrangement in the exemplary embodiment of FIGS. 3a, 3b and in the case of an attenuation of the signal of the second path by 60%.

FIG. 3a shows the transmission spectrum for the upper path 3 and FIG. 3b shows the transmission spectrum for the lower path 4. The total attenuation at the output of the arrangement is once again illustrated for attenuation by the attenuating unit 2 by 20%, 40% and 60% in FIGS. 3c to 3e.

The greater the degree of attenuation set by the attenuating unit, the greater the "dip" in the transmission around the middle wavelength range of 1550 nm.

An application of this type is of interest for example in the compensation of the spectral-dependent transmission of phased arrays, which provide a grating for diffracting the light signals and typically realize a poorer transmission for the outer channels.

A third application example is illustrated in FIGS. 4a to 4e. In this case, the Mach-Zehnder filter 1 is set in such a way that, given a channel spacing of 400 GHz corresponding to approximately 3 nm, every second channel must pass through the attenuating unit 2. Accordingly, the input signal of FIG. 3a is split into the two paths 3, 4 by the Mach-Zehnder filter 1 in such a way that mutually adjacent channels are in each case transmitted into a different one of the paths. Accordingly, every second channel traverses the attenuating unit 2.

Such spectral filtering by the filter 1 is effected by the difference in length of the two arms in the Mach-Zehnder interferometer 1 being chosen to be relatively large in accordance with the formulae (1) and (2) above, for example being of the order of magnitude of 1 mm. Since, in accordance with the abovementioned formulae, the $\sin^2$ or $\cos^2$ function depends on the value $\Delta L$, the period of this function becomes correspondingly small in the case of large $\Delta L$ values.

Figure 4A:
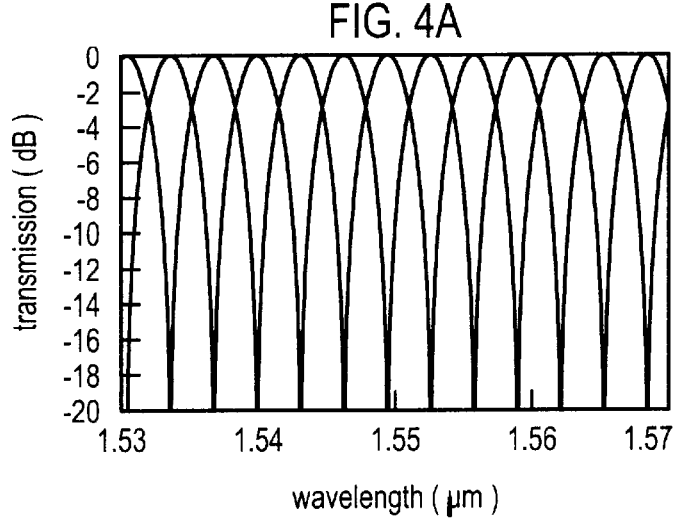
FIG. 4a shows an example of the frequency spectrum of the input signal of the arrangement according to the invention.
Figure 4B:
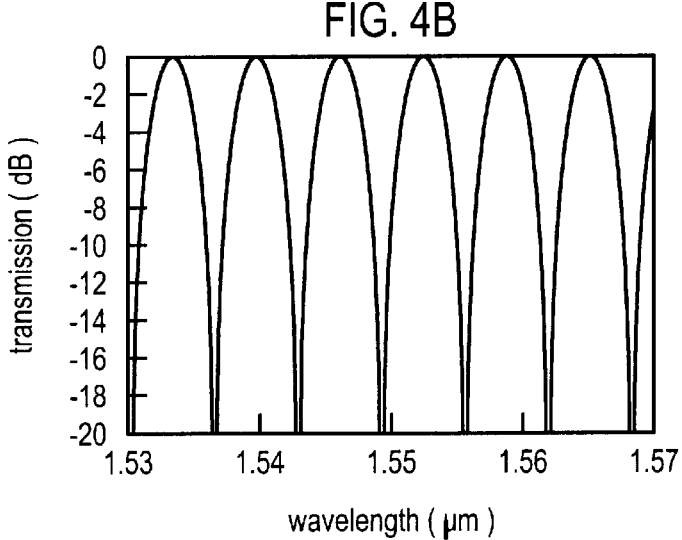
FIG. 4b shows a third exemplary embodiment of the spectral composition of the signal of one path.
Figure 4C:
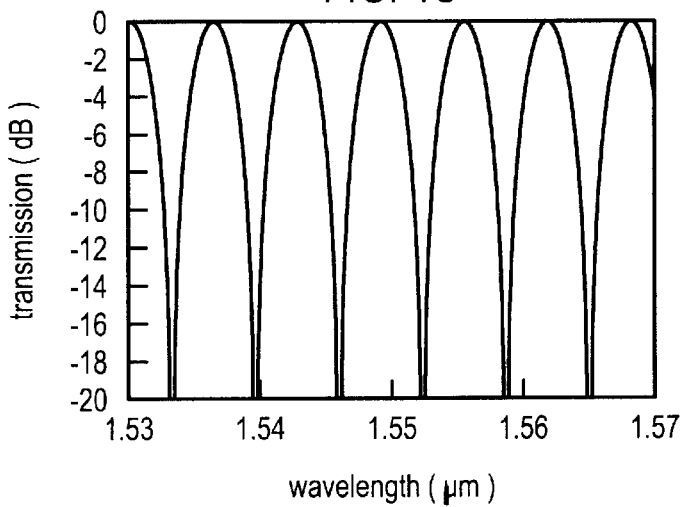
FIG. 4c shows the spectral composition of the other path of the exemplary embodiment of FIG. 4b.
Figure 4D:
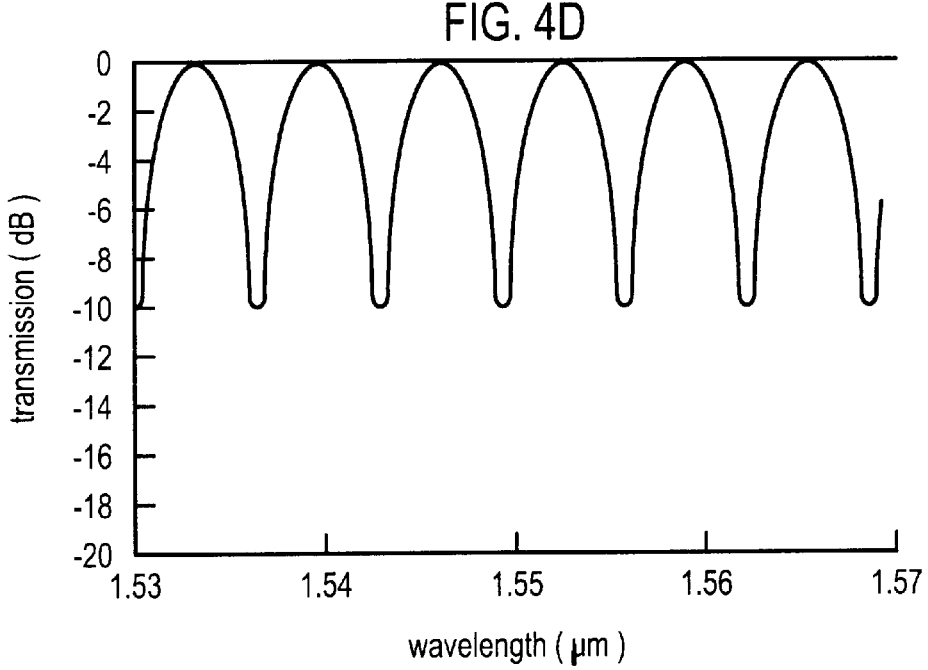
FIG. 4d shows the total attenuation of the arrangement in the exemplary embodiment of FIGS. 4b, 4c and in the case of an attenuation of the signal of the second path by 90%.
Figure 4E:
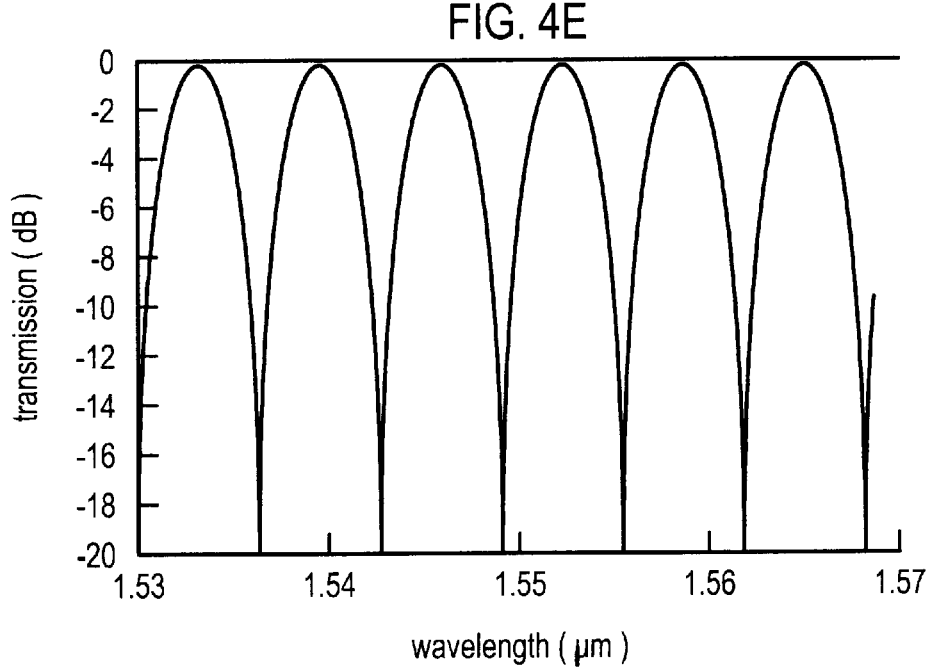
FIG. 4e shows the total attenuation of the arrangement in the exemplary embodiment of FIGS. 4b, 4c and in the case of an attenuation of the signal of the second path by 99%.

FIG. 4d shows the transmission spectrum at the output of the attenuating arrangement in the case of the signal conducted through the lower path 4 being attenuated by 90% by the attenuator unit 2, and FIG. 4e shows the output signal in the case of the signal conducted through the attenuator unit 2 being attenuated by 99%. Consequently, given correspondingly high attenuation, individual channels can be completely masked out of the overall signal. In this case, the Mach-Zehnder interferometer 1 can, of course, also be set to different channel spacings, so that, by way of example, every third or every fourth channel is completely masked out.

A preferred application of this exemplary embodiment consists in the realization of add-drop techniques, in which individual channels are completely removed from or added to a multiplexed signal.

In an alternative arrangement (not illustrated) according to the invention, alternatively or supplementarily, a Mach-Zehnder attenuator unit is also provided in the upper optical path 3. Depending on the desired application, the signal component of the upper or of the lower path is attenuated in this case. In the case of the signals of FIGS. 2a and 2b, attenuation of the signal component of the upper path 3 would lead, for example, to the lower wavelengths being attenuated to a greater extent. The curves of FIGS. 2c–2e would have a gradient having the opposite sign.

Furthermore, in alternative embodiments, it may be provided that the signal components of both paths are attenuated, but to different degrees. Frequency-dependent attenuation of the input signal can be realized by this means, too.

The application of the invention is not restricted to the exemplary embodiments presented above. All that is essential to the invention is that an input signal with a multiplicity of data channels be split wavelength-selectively between at least two paths, the signal components of one of these paths be attenuated and the paths or signals be subsequently recombined.

I claim:

1. A configuration for channel-dependent attenuation of levels of a plurality of optical data channels that each transmit signals of a specific wavelength, comprising:

a filter device for splitting an input signal of a plurality of optical data channels between at least two optical paths in a wavelength-dependent manner, each one of said optical paths carrying a portion of the input signal having a frequency composition differing from frequency compositions of portions of the input signal carried by other ones of said optical paths, the portion of the input signal including a multiplicity of said plurality of said optical data channels; and an attenuating device located on at least one of said optical paths for attenuating the portion of the input signal on said one of said optical paths;

said at least two optical paths and each portion of the input signal being recombined downstream of said attenuating device.

2. The configuration according to claim 1, wherein said attenuating device attenuates the portion of the input signal in a substantially wavelength independent manner.

3. The configuration according to claim 2, wherein:

said at least two optical paths define a first optical path and a second optical path;

said filter device is designed such that an upper one of the plurality of the optical channels, which has an upper wavelength, is conducted completely through said first optical path;

said filter device is designed such that a lower one of the plurality of the optical channels, which has a lower wavelength, is conducted completely through said second optical path; and said filter device is designed such that channels of the plurality of the optical channels, which have intermediate wavelengths, are conducted to a greater extent through said first optical path or said second optical path in dependence upon a proximity of the intermediate wavelengths to the upper wavelength and the lower wavelength.

4. The configuration according to claim 2, wherein:

said at least two optical paths define a first optical path and a second optical path;

said filter device is designed such that a middle one of said plurality of said optical channels, which has a middle wavelength, is conducted completely through said first optical path; and said filter device is designed such that additional ones of said plurality of said optical channels, which have additional wavelengths, are conducted increasingly through said second optical path with increasing distance from said middle one of said plurality of said optical channels.

5. The configuration according to claim 2, wherein said filter device is designed such that every n-th channel is, in each case, conducted through a different one of said optical paths.

6. The configuration according to claim 1, wherein:

said at least two optical paths define a first optical path and a second optical path;

said filter device is designed such that an upper one of the plurality of the optical channels, which has an upper wavelength, is conducted completely through said first optical path;

said filter device is designed such that a lower one of the plurality of the optical channels, which has a lower wavelength, is conducted completely through said second optical path; and said filter device is designed such that channels of the plurality of the optical channels, which have intermediate wavelengths, are conducted to a greater extent through said first optical path or said second optical path in dependence upon a proximity of the intermediate wavelengths to the upper wavelength and the lower wavelength.

7. The configuration according to claim 1, wherein:

said at least two optical paths define a first optical path and a second optical path;

said filter device is designed such that a middle one of said plurality of said optical channels, which has a middle wavelength, is conducted completely through said first optical path; and said filter device is designed such that additional ones of said plurality of said optical channels, which have additional wavelengths, are conducted increasingly through said second optical path with increasing distance from said middle one of said plurality of said optical channels.

8. The configuration according to claim 1, wherein said filter device is designed such that every n-th channel is, in each case, conducted through a different one of said optical paths.

9. The configuration according to claim 1, wherein:

said at least two optical paths define a first optical path and a second optical path;

said filter device includes a first Mach-Zehnder interferometer having a first arm with a length and a second arm with a length that is different than said length of said first arm; and said first arm and said second arm merge with said first optical path and said second optical path.

10. The configuration according to claim 9, comprising a first phase shifter located on said second arm of said interferometer.

11. The configuration according to claim 1, wherein:

said attenuating device includes a Mach-Zehnder interferometer that splits the portion of the input signal on said one of said paths into a first arm with a first signal portion and a second arm with second signal portion; and said attenuating device recombines the first signal portion and the second signal portion downstream of said Mach-Zehnder interferometer.

12. The configuration according to claim 11, comprising:

a phase shifter located on an arm selected from the group consisting of said first arm and said second arm;

said first arm having a length and said second arm having a length equivalent to said length of said first arm.

13. The configuration according to claim 12, wherein said phase shifter is located on said second arm and sets attenuation of said second signal portion.

14. The configuration according to claim 1, comprising:

a waveguide;

said at least two optical paths defining a first optical path carrying a first portion of the input signal and a second optical path carrying a second portion of the input signal;

said attenuating device located in said second optical path;

said waveguide located in said first optical path and routing the first portion of the input signal past said attenuating device without interference;

said first portion of the input signal and said second portion of the input signal being recombined downstream of said attenuating device.

15. The configuration according to claim 14, comprising a third phase shifter setting a phase of the first portion of the input signal.

16. The configuration according to claim 15, wherein said third phase shifter sets the phase of the first portion of the input signal such that a phase difference between the first optical path and the second optical path is a multiple of $2\pi$, said multiple including zero.

17. The configuration according to claim 1, wherein levels of individual ones of the plurality of the optical data channels are attenuated in a linearly increasing manner as wavelengths of the plurality of the optical data channels increase.

18. The configuration according claim 1, wherein each one of the plurality of the data channels lie in a wavelength range between 1530 nm and 1570 nm.

19. The configuration according to claim 1, wherein said filter device and said attenuating device are of an integrated optical design.

20. The configuration according to claim 19, comprising an integrated optical waveguide transmitting the plurality of the optical channels.

21. A method for channel-dependent attenuation of levels of a plurality of optical data channels that each transmit signals of a specific wavelength, the method which comprises:

providing an input signal of a plurality of optical data channels that each transmit signals of a specific wavelength;

splitting the input signal between at least two optical paths in a wavelength-selective manner such that each one of the optical paths caries a signal component of the input signal having a frequency composition differing from frequency compositions of signal components of the input signal carried by other ones of the optical paths, the signal component including a multiplicity of the plurality of the optical data channels;

attenuating the signal component-of at least one of the optical paths; and combining the optical paths after attenuating the signal component.

22. The method according to claim 1, wherein the step of attenuating the signal component includes attenuating the signal component in a virtually wavelength-independent manner.

23. The method according to claim 21, which comprises:

defining a signal component of another one of the optical paths as an unattenuated signal component; and combining the unattenuated signal component of the other one of the optical paths with the attenuated signal component of the one of the optical paths.

24. The method according to claim 21, which comprises:

that an upper channel of an upper wavelength is conducted completely through one path, a lower channel of a lower wavelength is conducted completely through the other path and the channels of the intervening wavelengths are conducted to a greater extent through one or the other path depending on their proximity to the upper and lower wavelength.

25. The method according to claim 21, which comprises:

completely conducting a middle one of the channels of a middle wavelength through one of the optical paths; and increasingly conducting additional ones of the channels, which have additional wavelengths, through another one of the optical paths with increasing distance from the middle one of the channels.

26. The method according to claim 21, which comprises, in each case, conducting every n-th channel through a different one of said optical paths.

27. The method according to claim 21, which comprises:

performing the wavelength-selective splitting with a first Mach-Zehnder interferometer; and performing the attenuation with a second Mach-Zehnder interferometer.

28. A configuration for channel-dependent attenuation of levels of a plurality of optical data channels that each transmit signals of a specific wavelength, comprising:

a filter device for splitting an input signal of a plurality of optical data channels between at least two optical paths in a wavelength-dependent manner, each one of said optical paths carrying a portion of the input signal having a frequency composition differing from frequency compositions of portions of the input signal carried by other ones of said optical paths, the portion of the input signal including a multiplicity of said plurality of said optical data channels; and an attenuating device located on only one of said optical paths for attenuating the portion of the input signal on said one of said optical paths;

said at least two optical paths and each portion of the input signal being recombined downstream of said attenuating device.

29. A configuration for channel-dependent attenuation of levels of a plurality of optical data channels that each transmit signals of a specific wavelength, comprising:

a filter device for splitting an input signal of a plurality of optical data channels between at least two optical paths in a wavelength-dependent manner, each one of said optical paths carrying a portion of the input signal having a frequency composition differing from frequency compositions of portions of the input signal carried by other ones of said optical paths, the portion of the input signal including a multiplicity of said plurality of said optical data channels; and a plurality of attenuating devices, each one of said plurality of said attenuating devices located on a respective one of said optical paths for attenuating the portion of the input signal on said one of said optical paths differently than ones of said plurality of said attenuating devices located on other ones of said optical paths;

said at least two optical paths and each portion of the input signal being recombined downstream of said plurality of said attenuating devices.

* * * * *